Aug. 4, 1970     E. K. MACKENZIE     3,522,534
INDICATING DEVICE WITH WIRE POINTER-BALANCE
Filed Jan. 9, 1968
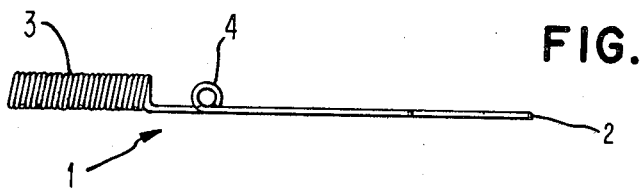
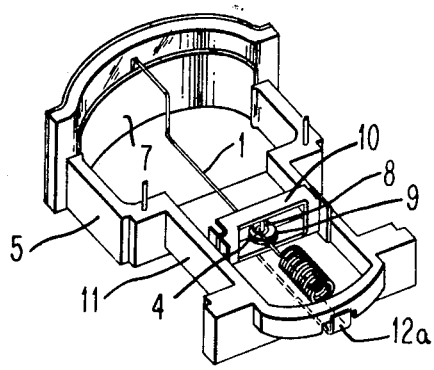
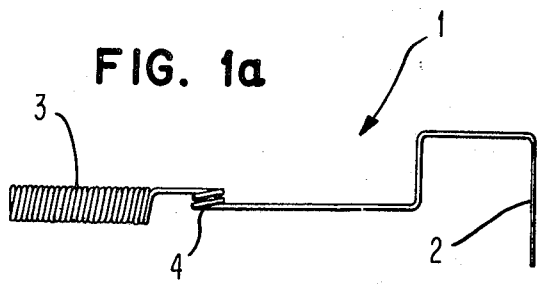
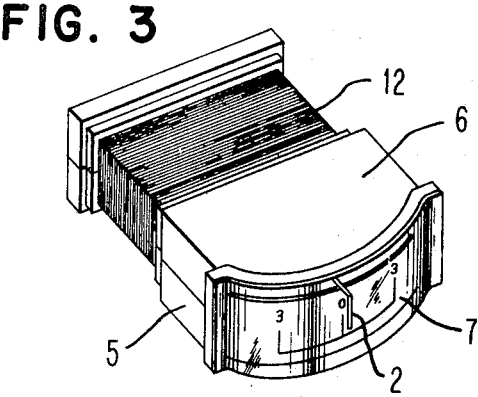
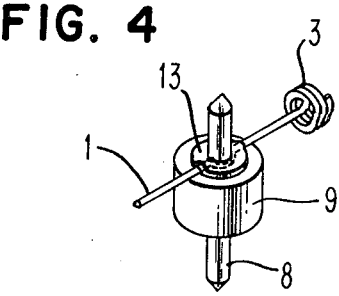
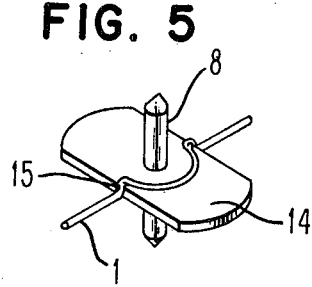
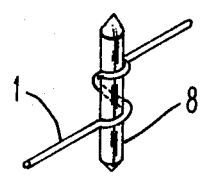
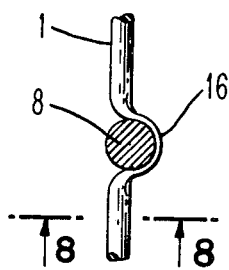
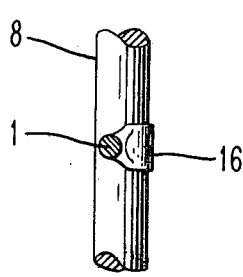

ical indicating meter.
United States Patent Office 3,522,534
Patented Aug. 4, 1970

3,522,534
INDICATING DEVICE WITH WIRE POINTER-BALANCE
Elbert K. Mackenzie, North Wales, Pa., assignor to Electro-Mechanical Instrument Company, Inc., Perkasie, Pa., a corporation of Pennsylvania
Filed Jan. 9, 1968, Ser. No. 696,592
Int. Cl. G01r 1/08
U.S. Cl. 324—154       8 Claims

ABSTRACT OF THE DISCLOSURE

The disclosure describes a one-piece hard aluminum wire pointer-balance for an electrical indicating meter. The wire pointer-balance is flattened at one end to form a pointer for the scale and is coiled at the other end to serve as a counterbalance weight. The wire pointer-balance is deformed into a loop between the two ends for securing it to the meter magnet. The particular meter shown is of the edgewise type including an elongated hollow casing of dielectric material having a relatively wide perimetric groove adjacent the rear end and a rounded front end with a window for viewing the scale. An arbor mounted for rotation within the casing carries the permanent magnet. A current-carrying coil of wire is wrapped around the casing within the perimetric groove to secure the two casing sections together, as well as to activate the meter movement.

BACKGROUND OF THE INVENTION

Examples of electrical meters to which this invention is applicable are shown in U.S. Pats. 2,968,000, 3,094,659 and 3,200,332.

Indicating devices of this type commonly employ very thin stamped sheet metal pointers which are mounted on a rotatable arbor. During assembly these stamped sheet metal pointers are easily deformed. As a result, the pointer must be reshaped after the assembly is completed. Also, during the assembly, the bending of the pointer may cause it to be unbalanced. Therefore, after the assembly is completed, the pointer must be rebalanced. This is particularly a problem in the construction of meters which have no access to the movement after final assembly.

In prior art electrical meters a separate part is commonly provided for the pointer counterbalance. The reason for this is that if the counterbalance is constructed of the same material as the pointer, then the counterbalance must have a larger area than is desirable. In constructing meters, it is desirable to keep the moment arm of the counterbalance as short as possible so that the meter can be compact in size. For this reason, the counterbalance is commonly of a different, heavier, material than the pointer.

While the use of a separate part constructed of a heavier material for the counterbalance has allowed the meters to be compact in size, this construction has disadvantages. One important disadvantage is that the material from which the counterbalance is constructed will normally vary from piece to piece. Of course, the material from which the pointer is constructed will also vary from piece to piece. Therefore, when the two-piece pointer and counterbalance is mounted, individual rebalancing is required for each meter constructed. Also, when the two-piece pointer counterbalance is used, the fabrication is more complicated, and hence more expensive because additional operations are required to mount both the pointer and the counterbalance.

In prior art meters, the weight of the combined pointer and counterbalance has been a limitation on the sensitivity of the meter. It is known that the sensitivity of a meter is inversely related to the weight and that this relationship is exponential. Therefore, any reduction in weight of the combined pointer and counterbalance adds greatly to the sensitivity of the meter.

SUMMARY OF THE INVENTION

This invention relates to indicating devices and more particularly to such devices which have a one-piece wire pointer-balance.

In accordance with the present invention, a combined one-piece pointer-balance is formed of hard aluminum wire. The wire is flattened at one end to serve as a pointer and is formed into a coil at the other end to form a counterbalance. Between the two ends, the wire is deformed to secure it to a permanent magnet which is mounted on the rotatable arbor.

Accordingly, it is an object of the present invention to provide a one-piece pointer-counterbalance which will maintain its original shape and balance during assembly so that no final adjustment of shape and balance is required.

It is another object of the invention to provide a one-piece wire pointer-balance which allows easy rebalance and adjustment in those meters where precise balance is essential.

It is another object of the present invention to provide a lightweight movement for increased sensitivity.

It is another object of the present invention to provide a meter which can be assembled from stock parts and which will be approximately balanced regardless of variations in thickness of the stock parts.

It is another object of the present invention to provide a meter in which the position of the pointer relative to the magnet can be easily adjusted.

It is another object of the present invention to provide a one-piece wire pointer-balance which can be easily formed on standard high production wire forming machines.

It is another object of the present invention to provide a one-piece wire pointer-balance which can be easily shaped at one end to obtain the desired pointer tip shape.

It is another object of the present invention to provide a one-piece wire pointer-balance which can be formed from a basic piece of wire having one end thereof coiled and which can be further modified in a variety of ways to obtain different meter pointers for different applications.

The foregoing and other objects, features, and advantages of the invention will be better understood from the following more detailed description and appended claims in conjunction with the drawings which show:

DESCRIPTION OF THE DRAWINGS

FIGS. 1 and 1a show the one-piece wire pointer-balance of the present invention;

FIG. 2 is a perspective view of one-half of the casing with the movement of one type of meter, to which the invention is applicably exposed;

FIG. 3 is a perspective view of the complete meter of this type; and

FIGS. 4–8 show modifications of the manner in which the pointer-balance is mounted on the magnet or on the arbor.

DESCRIPTION OF A PARTICULAR EMBODIMENT

Referring now to FIGS. 1 and 1a, the one-piece wire pointer-balance 1 of this invention is formed with a flattened pointer end 2 which will cooperate with the scale. The other end is wound into a helical coil 3 which forms the counterbalance. Between the two ends the coil is formed into two or more loops 4 which may be sprung over the arbor. The pointer-balance 1 is preferably formed from hard aluminum wire. The coil 3 can be easily formed on an automatic spring coiler. In one method of fabricating the pointer-balance, the coils or loops 4 are formed during the same spring coiling operation. Then the lops 4 are bent away from the coil 3 into the position shown. If the loops 4 are not of the same diameter as the coil 3, the loops 4 can be formed as an additional operation.

It has been found that hard aluminum wire is sufficiently ductile that it can be flattened and bent to form the pointer 2 but it is still sufficiently resilient to maintain its shape during assembly and operation of the meter. The pointer of FIG. 1a is in the form of three sides of a rectangle with one leg flattened to form a pointer. Alternatively, the pointer can be formed into a full rectangle with the rectangle at 90° with respect to that of FIG. 1a. Two opposite legs of this rectangle extend over the meter scale and coact with the meter to indicate a limit zone or tolerances on the variable being measured. Various other configurations which emphasize the values on the scale may be used. The end of the pointer may be bent to indicate three tolerance zones, or it can be bent into a diamond shape so that the scale values are bracketed in the diamond.

The one-piece pointer-balance is shown in place in the meter shown in FIG. 2. While the present invention is applicable to many types of indicating devices, it is shown in FIGS. 2 and 3 in an edgewise electrical meter. The meter includes a hollow casing of dielectric material formed by the two casing halves 5 and 6. A graduated scale 7 is disposed in an opening of the casing. While a graduated scale has been shown, it will be understood that the invention may be used with an indicating device other than one using a graduated scale. For example, the invention may be used with a simple on-off indicator. The word "scale" as used herein and in the claims is meant to cover any such indicating indicia.

The meter movement includes a rotatable arbor 8 on which the movement magnet 9 is mounted. The arbor 8 is pivoted in indents in the bracket 10. The one-piece pointer-balance 1 is also mounted on the arbor by the coils 4.

The casing of this particular type meter includes a perimetric groove 11 at the rear of the meter.

The coil 12 is wound in the perimetric groove to hold the two halves of the meter together. A control magnet, not shown, is rotatably mounted and adjusted by the arm 12a to set the pointer to zero. A meter of this type is more fully described in U.S. Pat. 2,968,000.

It will be appreciated that after the coil is wound on the meter, no further adjustments of the pointer shape or balance can be made because there is no longer access to the movement of the meter. Therefore, in this type of meter the use of the hard aluminum one-piece wire pointer-balance is particularly advantageous.

While the resiliency of the hard aluminum wire prevents inadvertent deformation of the shape, which is a particular advantage in the meter shown in FIGS. 2 and 3, it will be understood that the hard aluminum wire is also sufficiently ductile so that the shape and length of the coil 3 can be changed to accurately balance the meter as is required in some other types of meters. The coil 3 can be extended to change the moment arm of the balance weight, the wire can also be bent to accurately align the coil 3 with the pointer 2 as is desirable. The pointer-balance shown in FIG. 1 is particularly suitable for use in instruments where it is desirable to adjust the position of the pointer on the arbor. This can be simply done by unwinding the loops 4 slightly to release the torsional forces so that the assembly is loose on the arbor. It can then be rotated to the proper position. The hard aluminum is sufficiently resilient so that when released, the loops snap back on the arbor to again firmly position the pointer-balance on the arbor.

OTHER MODIFICATIONS OF THE INVENTION

In the modification shown in FIG. 4, instead of forming the loops 4 in the wire, a simple offset has been formed in the wire. This offset is positioned over the arbor 8 and against the movement magnet 9. A bushing 13, constructed of a soft material, is positioned over the wire to hold it firmly in place against the movement magnet 9. The bushing 13 is constructed of a material which can be deformed to hold it securely in place.

In FIG. 5, there is shown an embodiment for securing the pointer-balance 1 to a bar magnet 14. In this embodiment, the pointer-balance 1 is formed into a spring clamp 15 which is snapped over the bar magnet 14.

In FIG. 6, the pointer-balance 1 has a pair of offsets which are axially disposed to secure the pointer-balance 1 to the arbor 8.

FIGS. 7 and 8 show a modification in which the pointer-balance 1 is flattened and the flattened portion 16 is formed into an indent which is snapped over the arbor 8. Because the flattened portion extends more than halfway around the arbor, it remains securely fastened to the arbor.

FIG. 8 shows another view of the assembly of FIG. 7 showing how the flattened portion 16 maintains the pointer-balance in a fixed angular relationship to the arbor 8.

The shape of the loops in the pointer-balance of FIGS. 4–8 permits easy fabrication of these loops on a 4-slide machine.

While particular embodiments of the invention have been shown and described, it will be understood that various modifications may be made without departing from the principles of the invention. The appended claims are, therefore, intended to cover any such modifications within the true spirit and scope of the invention.

What is claimed is:
1. An electrical indicating meter comprising:
   a rotatable arbor,
   means for rotating said arbor in response to an applied electrical signal,
   a scale, and
   a one-piece wire pointer-balance disposed for movement of one end along said scale, said wire being flattened at said one end to serve as a pointer, said wire being formed into a plurality of helical coils at the other end to serve as a counter balance weight, said wire having a formed portion between the ends thereof adapted for attachment of said pointer-balance to said arbor.
2. The device recited in claim 1 wherein said wire pointer-balance is hard aluminum.
3. The device recited in claim 1 wherein said one end is formed to emphasize the values on said scale.
4. The meter recited in claim 1 wherein the formed portion between the ends thereof includes a single helical coil formed at the same time as the helical coils forming the counterbalance weight, said single coil being separated from the remainder of said helical coils to form a resilient clamp for said arbor.
5. In an electrical indicating meter of the type including:
   a casing,
   a scale disposed in an opening of said casing,
   an arbor mounted for rotation in said casing,
   a permanent magnet affixed to said arbor, and
   a current-carrying coil of wire for applying magnetic flux to rotate said magnet and said arbor when said coil is energized, the improvement comprising:
   a one-piece wire pointer-balance formed at one end for movement along said scale, said pointer-balance being disposed for rotation with said arbor, said wire pointer-balance having a plurality of helical coils at the other end to serve as a counterbalance weight.

6. The meter recited in claim 5 wherein said pointer-balance is shaped into a clamp between the two ends for securing said wire pointer-balance to said arbor.

7. The meter recited in claim 5 wherein said wire pointer-balance is formed from hard aluminum having sufficient ductility to permit changing the length and length and shape of the coiled end to adjust the balance, said hard aluminum having sufficient resilience so that said wire pointer-balance retains its shape during handling and operation of said meter.

8. An electrical edgewise meter comprising:
a flat elongated hollow casing of dielectric material, said casing being formed by two complemental interfitting half sections,
a graduated scale disposed in an opening of said casing,
an arbor mounted for rotation in said casing,
a permanent magnet affixed to said arbor,
a current-carrying coil of wire wrapped about the casing to secure said two casing sections together, and to provide magnetic flux for reaction with the flux of the permanent magnet on said arbor, and
a one-piece wire pointer-balance formed at one end for movement along said scale, said pointer- balance being shaped into a clamp between the two ends for securing said pointer-balance to said arbor, said wire pointer-balance being coiled at the other end to serve as a counterbalance weight, said wire pointer-balance being formed of hard aluminum wire having resiliency preventing deformation of said wire pointer-balance being formed of hard aluminum wire having resiliency preventing deformation of said wire pointer-balance during construction so that rebalancing is not required after said coil is positioned on said meter.

References Cited

UNITED STATES PATENTS

| 727,041 | 5/1903 | Weston. | |
| 2,968,000 | 1/1961 | Pfeffer | 324—146 |

FOREIGN PATENTS

| 946,191 | 7/1956 | Germany. |
| 45,077 | 5/1935 | France. |

RUDOLPH V. ROLINEC, Primary Examiner

E. L. STOLARUN, Assistant Examiner

U.S. Cl. X.R.

116—136.5